Feb. 18, 1958 W. J. MEINHARDT 2,824,293
SAFETY DEVICES
Filed April 5, 1956
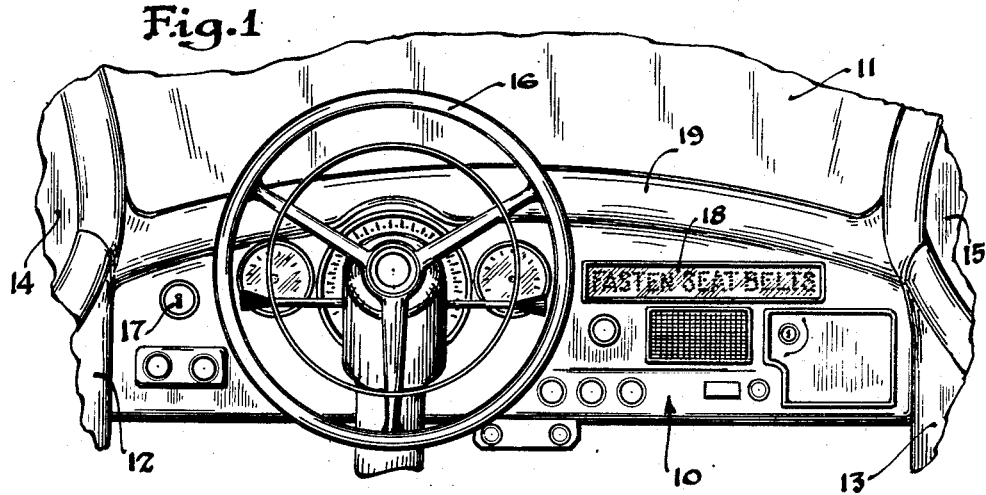
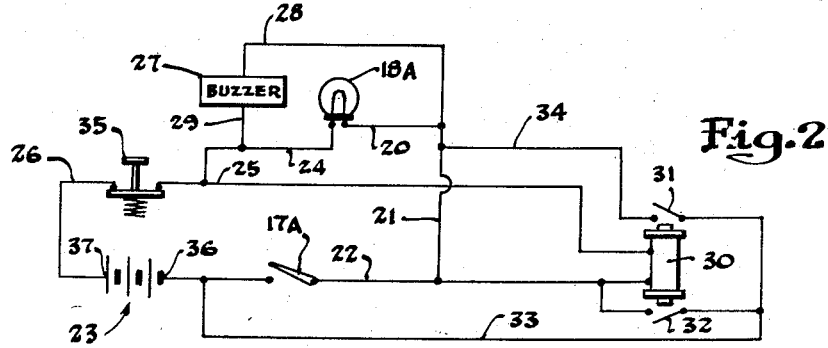
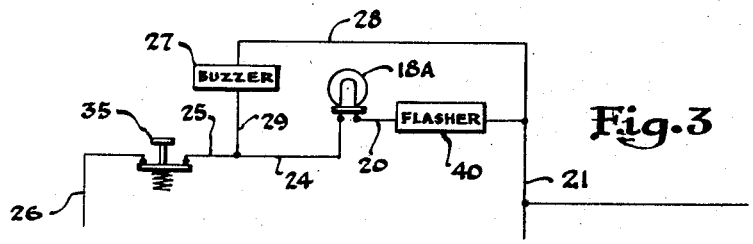
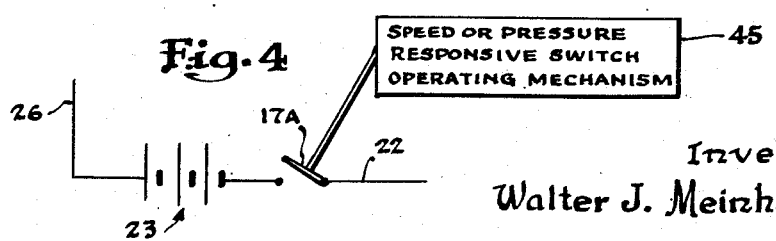
Inventor
Walter J. Meinhardt
By Wallace and Cannon
Attorneys United States Patent Office 2,824,293
Patented Feb. 18, 1958

2,824,293
SAFETY DEVICES

Walter J. Meinhardt, Chicago, Ill.

Application April 5, 1956, Serial No. 576,431

7 Claims. (Cl. 340—52)

This invention is directed to a new and improved warning signal system for an automotive vehicle and is particularly concerned with a system which warns a passenger in that vehicle to fasten his safety belt as soon as the engine of the vehicle has been started.

Safety belts for automobiles have long been available and are steadily increasing in popularity as it becomes more apparent that they are extremely valuable in avoiding injury from collisions, particularly at relatively high speeds. The effectiveness of seat belts as safety devices, however, is substantially lessened by the fact that they frequently remain unused because the driver or other passengers forget to fasten them at the time the car is started. This is particularly true in the case of a passenger who is not familiar with the vehicle and does not normally ride in a car equipped with safety belts. Frequently, although the driver may be well acquainted with the car, he forgets to advise other passengers of the presence of the safety belt or may even forget to fasten his own; under these conditions, the belts serve no useful purpose.

It is an object of the invention, therefore, to provide a new and improved warning signal system for an automotive vehicle equipped with safety belts which will automatically warn the driver and other passengers to fasten their safety belts as soon as the engine has been started.

It is a further object of the invention to provide a new and improved signal system of this general type which may be readily deactivated at the will of the driver.

It is an additional object of the invention to provide a warning signal system for an automotive vehicle equipped with safety belts which may be manually energized by the driver or alternatively may be automatically set in operation in response to a change in the operational status of the vehicle.

It is a corollary object of the invention to provide a warning signal system for an automobile equipped with safety belts which is relatively inexpensive and economical to manufacture and which is convenient to install in the automobile.

A warning signal system constructed in accordance with the invention and adapted for use in an automotive vehicle equipped with safety belts comprises an electrically actuated signal indicator for warning a passenger in the vehicle (the term passenger as used in this specification and in the appended claims includes the driver) that the safety belt should be fastened. The system further comprises a normally open energizing circuit which is coupled to the signal indicator and an instantaneous-contact switch means for closing the energizing circuit. This switch means may be coupled to the starter switch of the vehicle or to an automatic speed-controlled actuating device. The system also includes means energized from the aforesaid energizing circuit to establish a holding circuit which effectively maintains the energizing circuit in its closed condition after the instantaneous-contact switch means is released. Manually operable normally-closed switch means are interposed in circuit between the holding circuit means and the energizing circuit to de-energize the holding circuit means and restore the energizing circuit to its normal open condition.

Other and further objects of the present invention will be apparent from the following description and claims and are illustrated in the accompanying drawing which, by way of illustration show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is an elevation view of the dashboard of a conventional automotive vehicle showing the signal indicator portion of the invention mounted in operating position;

Fig. 2 is a schematic diagram of one embodiment of a warning signal system constructed in accordance with the invention;

Fig. 3 is a schematic diagram showing a portion of the embodiment of Fig. 2 modified in accordance with a second embodiment of the invention; and Fig. 4 is a schematic diagram illustrating a further modification of the invention.

The elevation view of Fig. 1 shows the dashboard 10 and surrounding area of a conventional automotive vehicle, including the usual windshield 11, doors 12 and 13 having windows 14 and 15 respectively, and the conventional steering wheel 16. The ignition switch for the vehicle is shown at 17; in accordance with the usual practice, the starter switch for the vehicle may be associated with ignition switch 17 or may be mounted at some other position on the dashboard 10 or on the floor of the vehicle. In the ensuing discussion of the invention, it is assumed that ignition switch 17 includes the starter switch, although this is not necessary to the inventive concept.

Fig. 1 also shows a warning sign or signal indicator 18 bearing the legend "Fasten Seat Belts" or some similar warning indication. Signal indicator 18 is shown mounted integrally with dashboard 10 in the upper right hand position of the dashboard; however, it should be understood that the visual indicator may be positioned above the upper portion 19 of the dashboard if this is necessary in order to make it readily visible from any normal passenger position within the car. Mounting above the dashboard may also be desirable where the system is to be installed in an automobile after it has left the factory, in which case the signal indicator may comprise a separate unit affixed to the dashboard or to windshield 11 by suction cups, bolts, or other suitable fastening means.

The electrical and operational characteristics of the warning system are best understood by reference to the schematic diagram of Fig. 2, in which visual signal indicator 18 is represented by a lamp 18A. As shown in this figure the signal indicator lamp is connected to an energizing circuit comprising conductors 20, 21, and 22 connected in series to one terminal 36 of a source of electrical energy represented by a battery 23; the energizing circuit further includes the conductors 24, 25, and 26 connected in series between the other terminal of lamp 18A and the second terminal of 37 battery 23. The signal indicator may also include a conventional buzzer or other audible warning device 27 which is preferably connected in parallel with visual indicator lamp 18A as by a pair of conductors 28 and 29.

Conductors 22 and 25 of the energizing circuit are extended and connected to the operating coil terminals of a relay 30 which forms a part of a holding circuit for the system. Relay 30 includes a pair of normally-open switches 31 and 32; switch 32 has one terminal connected to conductor 22 and a second terminal connected to the terminal 36 of battery 23 by means of a conductor 33. One terminal of switch 31 is connected to conductor 33 and the other terminal of the switch is connected to the conductor 21.

The warning signal system illustrated in Fig. 2 further includes an instantaneous-contact switch 17A which preferably comprises the starter switch of the automobile or an independent switch mechanically or electrically actuated from the automotive starter switch. It should be borne in mind that this is not the maintained-contact ignition switch of the vehicle, nor is switch 17A actuated from the ignition switch, since it is not intended that the warning signal system be actuated continuously during operation of the car. In addition, a normally closed instantaneous-contact switch 35 is interposed in circuit between conductors 25 and 26 of the energizing and holding circuits of the ssytem.

When the warning signal system is installed in the automobile or other automotive vehicle, and the starter switch 17A is closed, the signal indicator comprising lamp 18A and/or buzzer 27 is energized through the circuit comprising conductors 20—22 and 24—26 (for the lamp) and conductors 28 and 29 (for the buzzer). At the same time, relay 30 is actuated to close switches 31 and 32. As soon as the vehicle is started, starter switch 17A is opened, thus interrupting the initial energizing circuit. The circuit is maintained effectively closed, however, by the holding circuit established by switches 31 and 32 of relay 30. Thus, signal indicators 18A and 27 remain energized through the circuit comprising conductors 33 and 34, which supplement the initial energizing circuit connections, and the relay circuit itself is maintained closed by the connection afforded by conductor 33 and switch 32.

The system illustrated in Fig. 2 remains in operation, providing a visual and/or audible warning to the passengers, for an indefinite period. As soon as the driver or one of the other passengers determins that all safety belts have been fastened, however, the system may be completely de-energized by momentarily opening the normally-closed switch 35. As soon as switch 35 is opened, relay 30 is de-energized; accordingly, the warning system remains quiesent until the next time the switch 17A is actuated. Consequently, the visual indication provided by indicator 18 (Fig. 1) may be made extremely bright and eye-catching and buzzer 27 may be made relatively loud without the danger of distracting the driver, since he is able to turn it off at will. On the other hand, because the system does remain in operation in the absence of an affirmative action by one of the passengers, its effectiveness is enhanced, since it continues to issue its visible or audible warning until someone has noticed it.

Fig. 3 shows a portion of the warning system of Fig. 2 modified to provide a somewhat more effective visual warning to the passengers in the vehicle, including the driver. In this embodiment, lamp 18A is again energized through a circuit comprising conductors 20, 21, 24, 25, and 26 and buzzer 27 is energized by the circuit including conductors 28 and 29, the remainder of the energizing circuit not being shown in this view. In this embodiment, a conventional "flasher" or vibrator 40 is connected in series with energizing circuit conductor 20 to provide an intermittent connection in the energizing circuit for lamp 18A. By thus making the visual signal indicator a flashing or intermittent one, the attention-getting properties of the system are enhanced somewhat.

Fig. 4 illustrates a further modification of the system which permits actuation of the warning signal system in response to a particular operational status of the vehicle. The safety value of seat belts is greatest at high speeds, and they may be dispensed with at the relatively low speeds of city driving without undue increase in the danger of injury. Consequently, many passengers do not care to utilize the seat belts when only a relatively short, slow trip is to be undertaken. On the other hand, it is not always possible to determine in advance just what speeds will be attained during a trip, and the city jaunt may in effect become a high speed drive where modern expressways or similar high-speed roads are utilized. Consequently, it may be desirable to have the warning signal system actuated in response to an increase in speed of the vehicle. For this purpose, switch 17A may be actuated by a conventional speed or pressure responsive switch operating mechanism 45 connected to a speedometer cable suitably mounted in the automobile. Where automatic actuation of the energizing circuit switch is desired, it is usually preferable to employ a separate speedometer cable, rather than using the cable employed for speed and mileage indications, since coupling the switch operating mechanism to the speedometer itself would in many instances lead to inaccurate speed indications. Of course, both manual and automatic actuation of the energizing circuit switch 17A may be provided in the same system, either by providing two switches connected in parallel with each other or by utilizing a single switch which may be closed either manually or automatically.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A warning signal system for an automotive vehicle equipped with safety belts comprising: an electrically actuated signal indicator for warning a passenger in said vehicle that the safety belt should be fastened; a normally open energizing circuit coupled to said signal indicator; instantaneous-contact switch means for closing said instantaneous-contact switch means in response to occurrence of a predetermined operating condition in the normal operation of said vehicle; means for closing said energizing circuit; means energized from said energizing circuit to establish a holding circuit for effectively maintaining said energizing circuit in closed condition; and manually operable normally-closed switch means interposed in circuit between said holding circuit means and said energizing circuit for de-energizing said holding circuit means to restore said energizing circuit to its normal open condition.

2. A warning signal system for an automotive vehicle equipped with safety belts comprising: an electrically actuated signal indicator for providing a visual warning to a passenger in said vehicle that the safety belt should be fastened; a normally open energizing circuit coupled to said signal indicator; instantaneous-contact switch means for closing said energizing circuit; an actuating device for automatically closing said switch means whenever said vehicle attains a predetermined speed; means energized from said energizing circuit to establish a holding circuit for effectively maintaining said energizing circuit in closed condition; and a manually operable normally closed switch interposed in circuit between said holding circuit means and said energized circuit for de-energizing said holding circuit means to restore said energizing circuit to its normal open condition.

3. A warning signal system for an automotive vehicle equipped with safety belts comprising: an electrically actuated signal indicator for providing both a visual and an audible warning to a passenger in said vehicle that the safety belt should be fastened; a normally open energizing circuit coupled to said signal indicator; instantaneous-contact switch means for closing said energizing circuit; means for closing said instantaneous-contact switch means in response to occurrence of a predetermined operating condition in the normal operation of said vehicle; means energized from said energizing circuit to establish a holding circuit for effectively maintaining said energizing circuit in closed condition; and manually operable normally closed switch means interposed in circuit between said holding circuit means and said energizing circuit for de-energizing said holding circuit means to restore said energizing circuit to its normal open condition.

4. A warning signal system for an automotive vehicle equipped with safety belts comprising: an electrically actuated signal indicator for providing a visual warning to a passenger in said vehicle that the safety belt should be fastened; a normally open energizing circuit coupled to said signal indicator; instantaneous-contact switch means connected to the starter switch of said vehicle for closing said energizing circuit in response to actuation of the starter switch; means energized from said energizing circuit to establish a holding circuit for effectively maintaining said energizing circuit in closed condition; and manually operable normally closed switch means interposed in circuit between said holding circuit means and said energizing circuit for de-energizing said holding circuit means to restore said energizing circuit to its normal open condition.

5. In an automotive vehicle equipped with safety belts and including an ignition system comprising a battery and a starter switch, a warning system comprising: an electrically actuated signal indicator mounted on the dashboard of said vehicle for providing a visual warning to a passenger in said vehicle that the safety belt should be fastened; a normally open energizing circuit interconnecting said signal indicator and said battery; instantaneous contact switch means coupled to said starter switch for closing said energizing circuit in response to actuation of the starter switch; means energized from said energizing circuit to establish a holding circuit for effectively maintaining said energizing circuit in closed condition; and manually operable normally closed switch means interposed in circuit between said holding circuit means and said energizing circuit for de-energizing said holding circuit means to restore said energizing circuit to its normal open condition.

6. In an automotive vehicle equipped with safety belts and including an ignition system comprising a battery and a starter switch, a warning system comprising: an electrically actuated signal indicator mounted on the dashboard of said vehicle for providing a visual warning to a passenger in said vehicle that the safety belt should be fastened; a normally open energizing circuit interconnecting said signal indicator and said battery; instantaneous-contact switch means for closing said energizing circuit; an actuating device for automatically closing said switch means whenever said vehicle attains a predetermined speed; means energized from said energizing circuit to establish a holding circuit for effectively maintaining said energizing circuit in closed condtion; and manually operable normally closed switch means interposed in circuit between said holding circuit means and said energizing circuit for de-energizing said holding circuit means to restore said energizing circuit to its normal open condition.

7. A warning signal system for an automotive vehicle equipped with safety belts comprising: an electrically actuated signal indicator for providing a visual warning to a passenger in said vehicle that the safety belt should be fastened; a normally open energizing circuit coupled to said signal indicator; instantaneous-contact switch means for closing said energizing circuit; means for closing said instantaneous-contact switch means in response to occurrence of a predetermined operating condition in the normal operation of said vehicle; means comprising a holding relay energized from said energizing circuit through said switch means to establish a holding circuit for effectively maintaining said energizing circuit in closed condition; and manually operable normally closed switch means interposed in circuit between said holding circuit means and said energizing circuit for de-energizing said holding circuit means to restore said energizing circuit to its normal open condition.

References Cited in the file of this patent

UNITED STATES PATENTS

| | | |
|---|---|---|
| 2,292,392 | Miller | Aug. 11, 1942 |
| 2,466,355 | Baker | Apr. 5, 1949 |
| 2,501,080 | Nielsen et al. | Mar. 21, 1950 |
| 2,510,115 | Jakosky | June 6, 1950 |
| 2,718,628 | Bartelett, et al. | Sept. 20, 1955 |